United States Patent [19]

Hirota

[11] Patent Number: 5,194,082
[45] Date of Patent: Mar. 16, 1993

[54] METHOD OF MANUFACTURING GLASS MOLDING ARTICLES

[75] Inventor: Shinichiro Hirota, Hachioji, Japan

[73] Assignee: Hoya Corporation, Tokyo, Japan

[21] Appl. No.: 653,065

[22] Filed: Feb. 11, 1991

[30] Foreign Application Priority Data

Feb. 28, 1990 [JP] Japan .................................. 2-48662

[51] Int. Cl.$^5$ .................................................. C03B 23/00
[52] U.S. Cl. .............................................. 65/102; 65/64; 65/104
[58] Field of Search .................. 65/237, 168, 75, 80, 65/240, 140, 271, 272, 308, 37, 309-312, 102, 104, 64

[56] References Cited

U.S. PATENT DOCUMENTS

| | | | |
|---|---|---|---|
| 2,011,187 | 8/1935 | Rowe | 65/237 |
| 4,255,178 | 3/1981 | Braithwaite | 65/80 |
| 4,778,505 | 10/1988 | Hirota | 65/321 |
| 4,836,838 | 6/1989 | Hirota | 65/37 |
| 4,915,720 | 4/1990 | Hirota | 65/76 |

FOREIGN PATENT DOCUMENTS

458912 of 0000 Fed. Rep. of Germany ........ 65/237

Primary Examiner—Joye L. Woodard
Attorney, Agent, or Firm—Nixon & Vanderhye

[57] ABSTRACT

In a method of and an apparatus for manufacturing a plurality of kinds of glass molding articles, a plurality of processing compartments are arranged in order of processing steps. The compartments have their functions which process glass materials to be molded which are accommodated respectively in a plurality of molds and which are different in processing condition from each other. The function are different in property from each other. Each of the compartments is divided into a plurality of processing chambers having their functions which process the glass materials. The functions of the processing chambers of the compartment are identical in property with each other, but different in condition from each other. The molds remain respectively in the processing chambers for a predetermined period of time. The molds are successively moved to their respective subsequent processing chambers to process the glass materials to form the glass molding articles.

4 Claims, 4 Drawing Sheets

METHOD OF MANUFACTURING GLASS MOLDING ARTICLES

BACKGROUND OF THE INVENTION

The present invention relates to a method of and an apparatus for manufacturing plural types of glass molding articles.

In recent years, studies and research have been conducted on a method of manufacturing glass molding articles, in which a plurality of molds, each of which has had its surfaces formed respectively into optical mirror surfaces and each of which is made of a special or distinctive material, are used to press-mold glass materials within a non-oxidizing atmosphere, thereby producing the glass molding articles such as lenses or the like having optical mirror surfaces, which do not require further processings such as grinding finishing or the like after the press-molding. Applicant of this invention has already proposed an apparatus for carrying out the above-described method in Japanese Patent Laid-Open No. HEI 1-157425.

The apparatus according to the proposed invention comprises a plurality of processing compartments including a takeout/insertion compartment, a heating compartment, a soaking compartment, a press compartment, a cooling compartment and so on. These compartments have their respective processing functions which are different in nature or operation from each other. The processing compartments are arranged along a circle in order of processing steps. A plurality of molds having glass materials to be molded therein are connected in series to each other. In operation, the molds remain at the processing compartments for a predetermined period of time and, thereafter, are successively moved to their respective subsequent processing compartments by means of a mold moving mechanism which is in the form of a rotary table. In this manner, a series of precision molding steps can be done continuously.

In recent years, phenomena have advanced such as diversification of a use, shortening of life cycle of products, etc. in the field of manufacturing glass molding articles. Attendant upon the advance, an urgent need is present in the industry to be able to produce various types of molded glass articles in small batches, while simultaneously reducing production and delivery time. For example, in the case where plural types of optical components are combined with each other to form one set and a plurality of sets are needed simultaneously for delivery, it is impossible to deliver the sets until all of the optical components have been manufactured.

The manufacturing apparatus for the glass molding articles described previously is effective in the case where a single kind of glass molding article is manufactured. However, the molding apparatus is not necessarily suited for the case where plural types of glass molding articles are manufactured.

That is, if a variety of glass molding articles are to be produced by the use of a single manufacturing apparatus, it is necessary to keep the various processing chambers running at optimum conditions while manufacturing the respective glass molding articles, in the single molding apparatus. In short, heating temperature, soaking temperature, press temperature, gradual-cooling temperature, press time, press pressure and so on, that are the processing steps of the glass molding articles, all differ if the glass molding articles differ. Normally, glass molding articles must be produced in accordance with smooth temperature schedule in the following manner. That is, a glass material to be molded, which is inserted in the apparatus, is gradually heated within a predetermined compartment. At a particular point in time, the temperature of the glass material reaches a predetermined level, and the glass material is pressed. Subsequently, the glass material is gradually cooled to produce the glass article. Accordingly, in order to simultaneously mold a variety of glass materials within the same apparatus in a known manner in mixture, a known plurality of compartments must exist in mixture which are different in processing condition from each other so as to adequately treat every glass material to be molded. At this time, the series of compartments vary in temperature and an extremely strange or unique condition is present. Thus, in the past, no notice has been made of the fact that plural types of glass materials can be simultaneously molded within a single apparatus.

As described above, if an attempt is made to manufacture a variety of glass molding articles by means of the apparatus mentioned above within a short period of time, it would be necessary to install or mount a multiplicity of apparatuses in accordance with the types of the glass articles to be molded. Since, however, the apparatus of the type referred to above is extremely expensive, the stupendous cost of equipment would be inhibiting to potential manufacturers. In addition, the apparatus has a productive capacity more than is necessary with respect to the single type of glass to be molded, thereby resulting in reduction of the rate of operation.

SUMMARY OF THE INVENTION

It is therefore an object of the invention to provide a method of manufacturing a variety of glass molding articles, which enables the plural types of glass molding articles to be produced through a series of processing steps.

It is another object of the invention to provide an apparatus for carrying out the above-described method.

According to the invention, there is provided a method of manufacturing plural types of glass molding articles, comprising the steps of:

preparing a plurality of molds having a change of glass materials therein, the contents of each mold being different in processing condition from that of the other;

arranging a plurality of processing compartments in order of processing steps, the compartments having functions which process the glass materials, the functions being different in operation from each other, and the processing compartments being connected in series to each other;

dividing each of the compartments into a plurality of processing chambers, the processing chambers of the compartment having their respective functions which process the glass materials, and the functions of the respective processing chambers of the compartment being identical in operation within the process parameter, i.e. heating and pressure, with each other, but different in magnitude from each other;

causing the molds containing glass materials, to remain respectively in the processing chambers of the compartments for a predetermined period of time; and successively moving the molds to their respective subsequent processing chambers to process the glass materials to form the glass molding articles.

According to the invention, there is further provided an apparatus for manufacturing plural types of glass molding articles, comprising:

a plurality of processing compartments arranged in order of processing steps, the compartments having separate process parameters which process glass materials contained within the molds which are different in processing condition from each other, the functions being different in operation from each other, the processing compartments being connected in series to each other, each of the compartments being divided into a plurality of processing chambers, the processing chambers of the compartment having their respective functions which process the glass materials, the functions of the respective processing chambers of the compartment being identical in operation with the process parameter with each other, but different in magnitude from each other, wherein the changed molds remain respectively in the processing chambers for a predetermined period of time, and wherein the molds are successively moved to their respective subsequent processing chambers to process the glass materials to form the glass molding articles.

With the arrangement of the invention, the plurality of glass materials to be molded, which require different processing conditions than the others, are processed within the single processing compartment, and the plurality of molds, which remain for the predetermined period of time within the processing chambers of the single processing compartment, are moved respectively to the processing chambers of the subsequent processing compartment adjacent to the single processing compartment. Thus, the plurality of glass molding articles can be molded by a series of processing steps.

Specifically, the following advantages can be produced. That is, the method and the apparatus according to the invention enable the plural types of glass molding articles to be produced by a series of processing steps. Thus, an attempt can be made to shorten the production time typically associated with the manufacture of a variety of molded articles, thereby improving the rate of operation of the manufacturing apparatus, without the use of a multiplicity of manufacturing apparatuses which are high in cost.

DESCRIPTION OF THE EMBODIMENTS

Figure 1:
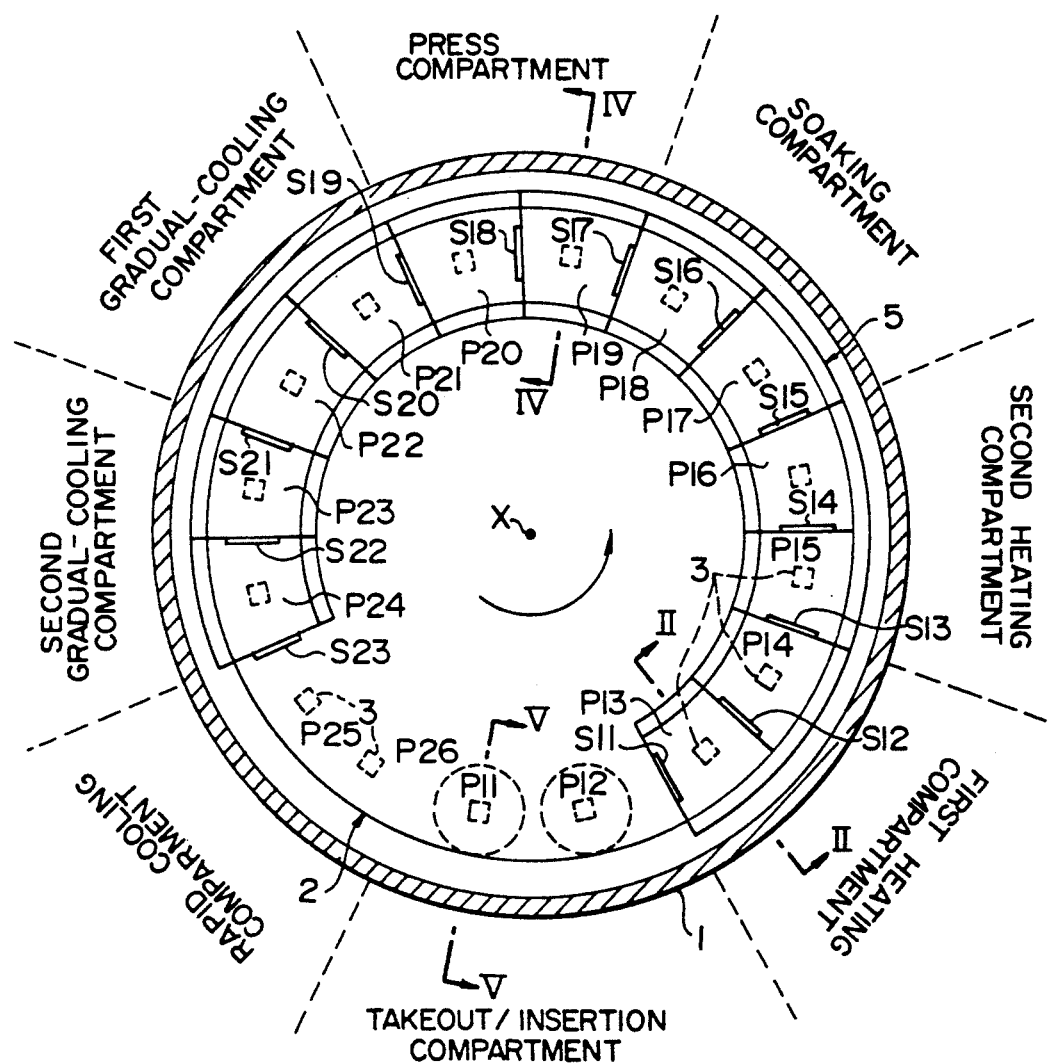
FIG. 1 is a schematic cross-sectional top plan view of an apparatus for manufacturing plural types of glass molding articles, according to an embodiment of the invention.
Figure 2:
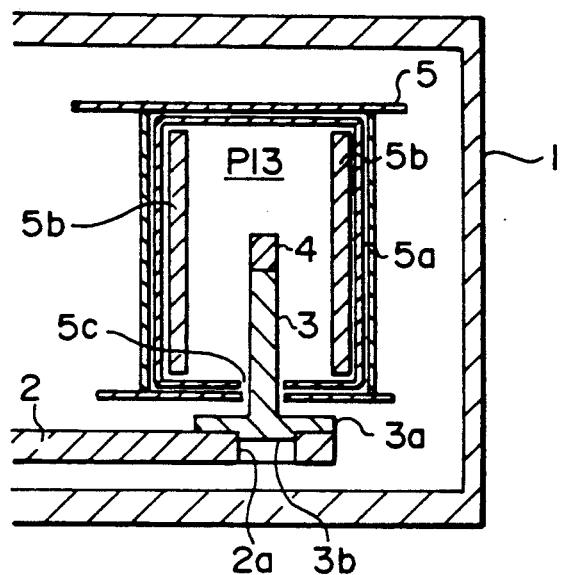
FIG. 2 is a somewhat enlarged, fragmentary cross-sectional view taken along the line II—II in FIG. 1.

Referring first to FIG. 1, there is shown an apparatus for manufacturing plural types of glass molding articles. The manufacturing apparatus comprises a closed or hermetic container 1, a rotary table 2 arranged within the closed container 1 for intermittent rotation about a vertical axis X, and a plurality of mold holding mounts 3 arranged on the rotary table 2 for angular movement together therewith about the axis X. As shown in FIG. 2, a plurality of molds 4 are mounted respectively on the mold holding mounts 3. Referring back to FIG. 1, a processing-chamber case 5 is arranged within the closed container 1 and is stationary therewithin.

The closed container 1 is made of stainless steel or other metals, and has its configuration in which a cylindrical body has its upper and lower openings which are hermetically sealed. As such, the interior can be maintained as a non-oxidizing atmosphere.

The rotary table 2 is in the form of a disc whose diameter is slightly smaller than an inner diameter of the closed container 1. The rotary table 2 is mounted to the closed container 1 for rotation about the central axis X such that the central axis X of the rotary table 2 is in agreement with the center of the closed container 1 and that the rear face of the rotary table 2 is arranged adjacent to the bottom of the closed container 1 (refer to FIG. 2). In addition, although not shown, rotary driving means is connected to the rotary table 2 so that the latter can be driven intermittently at predetermined time intervals. Further, the plurality of, sixteen (16) in the embodiment, mold holding mounts 3 are mounted to the rotary table 2 at a location adjacent to its outer periphery in equidistantly spaced relation to each other in the peripheral direction of the rotary table 2.

As shown in FIG. 2, each of the mold holding mounts 3 is generally in the form of an inverted T in cross-section. The mold holding mount 3 is formed, at its bottom 3a, with a projection 3b. The projection 3b is fitted in a mounting bore 2a formed in the rotary table 2. Thus, the mold holding mount 3 is fixedly mounted to the rotary table 2. The molds 4 are held respectively on the mold holding mounts 3.

Figure 3:
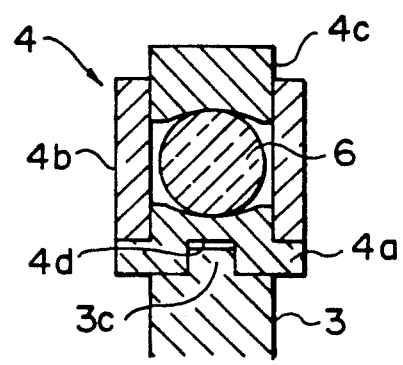
FIG. 3 is an enlarged fragmentary cross-sectional view of one of a plurality of molds which are used in the molding apparatus illustrated in FIG. 1.

As shown in FIG. 3, the mold 4 is composed of a lower mold portion or a drag 4a, a sleeve 4b fitted about the drag 4a and an upper mold portion or a cope 4c fitted in the sleeve 4b for sliding movement therealong. A glass material 6 to be molded is located between the drag 4a and the cope 4c. The drag 4a is formed, at its bottom, with a holding bore 4d which is fitted about a projection 3c formed at the forward end of the mold holding mount 3. Thus, the mold 4 is held by the mold holding mount 3.

Referring back to FIG. 1, the closed container 1 has its interior which is divided into eight (8) processing compartments in the peripheral direction. The processing compartments are connected in series to each other. The molds 4 remain respectively in the eight compartments for a predetermined period of time so that processing steps different in nature or operation from each other can be applied respectively to the molds 4 within the compartments. That is, the closed container 1 is divided into a takeout/insertion compartment, a first heating compartment, a second heating compartment, a soaking compartment, a press compartment, a first gradual-cooling compartment, a second gradual-cooling compartment and a rapid cooling compartment, in the left-hand rotation in the peripheral direction, in accordance with processing steps. Each of the compartments is further divided into two processing chambers. The chambers, which are identical in operation within the process parameter with each other, but are different in magnitude from each other, can simultaneously be applied respectively to the glass materials 6 within the two adjacent molds 4. That is, the takeout/insertion compartment is provided with two take/out insertion chambers P11 and P12, and the first heating compartment is provided with two first heating chambers P13 and P14. Likewise, the second heating compartment is provided with two second heating chambers P15 and P16, and the soaking compartment is provided with two soaking chambers P17 and P18. The press compartment is provided with two press chambers P19 and P20. The first gradual-cooling compartment is provided with two first gradual-cooling chambers P21 and P22. The second gradual-cooling compartment is provided with two second gradual-cooling chambers P23 and P24. The rapid cooling compartment is provided with two rapid cooling chambers P25 and P26.

Here, processing in the section from the first heating compartment to the second gradual-cooling compartment is processing under high temperature. For this reason, the processing chambers, which are formed in the section, are provided within the processing-chamber case 5 which is arranged within the closed container 1.

The processing-chamber case 5 is in the form of a hollow circular annulus or torus whose part corresponding to one fourth circuits is cut off in the peripheral direction. The processing-chamber case 5 is fixedly mounted to the closed container 1 in a manner not shown such that the processing-chamber case 5 has an axis which is in alignment with the central axis X of the rotary table 2, and that the processing-chamber case 5 has a bottom surface which is located adjacent to and opposed to the front surface of the rotary table 2. The processing-chamber case 5 has a circular-annular interior which is divided into twelve (12) processing chambers in the peripheral direction. Two processing chambers are allotted to each of the above-described compartments. Each of the processing chambers is provided with suitable means which is required for the various processing steps, such as heating means or the like. A plurality of openable shutters S11 and S12, S13 and S14, S15 and S16, S17 and S18, S19 and S20, S21 and S22, and S23 are provided respectively in partitions by which the processing chambers are divided.

Reference is made to FIG. 2 which is a cross-sectional view of the first heating chamber P13. As shown in FIG. 2, the processing-chamber case 5 has its inner surfaces whose substantial entirety is formed with a reflector 5a which reflects heat wave. The processing-chamber case 5 has four inner surfaces, and a plurality of heaters 5b are provided at both side faces of the inner surfaces of the processing-chamber case 5. Further, the processing-chamber case 5 has a bottom surface which is formed therein with a slit 5c. The mold holding mount 3 has an upper end portion which extends through the slit 5c and which is arranged substantially at the central area within the processing chamber P13. Furthermore, the mold holding mount 3 can freely be moved in the peripheral direction together with the rotary table 2.

Of the processing chambers formed within the processing-chamber case 5, each of the processing chambers with the exception of the press chambers P19 and P20 is identical in construction as the above-mentioned first heating chamber P13 and, accordingly, the description of the processing chambers with the exception of the pressing chambers P19 and P20 will be omitted.

Figure 4:
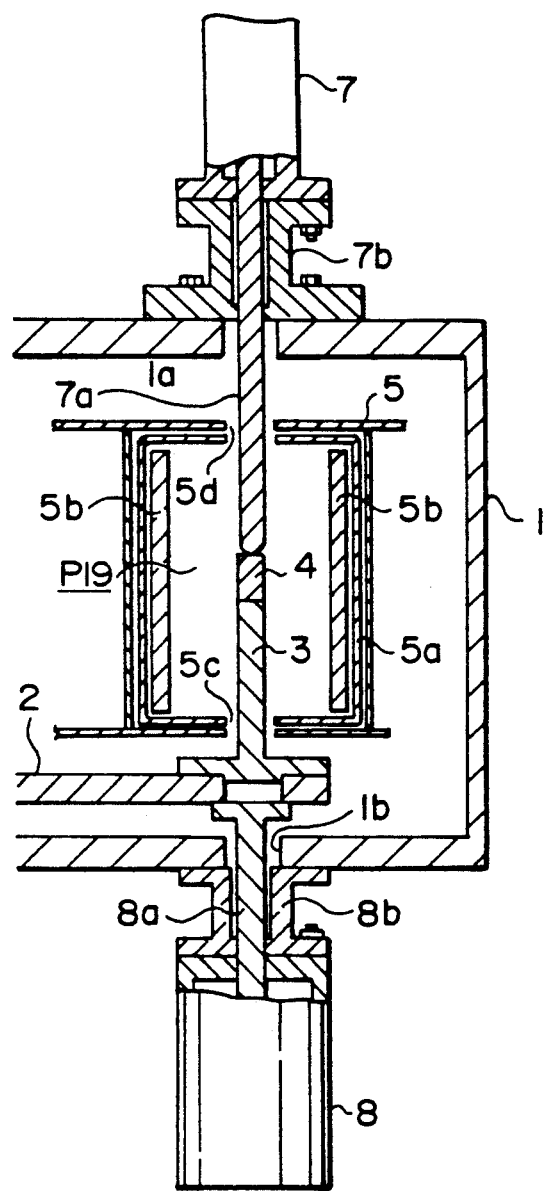
FIG. 4 is a fragmentary cross-sectional view taken along the line IV—IV in FIG. 1.

FIG. 4 is a cross-sectional view of the press chamber P19. As shown in FIG. 4, the press chamber P19 is different from the above-described other processing chambers only in that the press chamber P19 has an upper face which is provided with a pressure-rod insertion bore 5d. A pressurizing piston/cylinder assembly 7 is arranged on the upper face of the closed container 1 and has a piston rod 7a. At press processing, the piston rod 7a of the pressurizing piston/cylinder assembly 7 is inserted through the pressure-rod insertion bore 5d, and is moved downwardly to pressurize the cope 4c of the mold 4. Piston rod 8a of a support piston/cylinder assembly 8, which is arranged on the lower face of the closed container 1, supports a portion of the rotary table 2 to which the mold holding mount 3 is mounted, thereby performing the press processing. In this connection, the pressurizing piston/cylinder assembly 7 and the support piston/cylinder assembly 8 are fixedly mounted to the closed container 1 by their respective mounting fasteners 7b and 8b so as not to disturb the gas tightness of the closed container 1. Further, the piston rod 7a and the piston rod 8a are inserted into the closed container 1 respectively through bores 1a and 1b which are formed respectively in the upper and lower faces of the closed container 1.

The takeout/insertion chambers P11 and P12 and the rapid cooling chambers P25 and P26 are formed on the outside of the processing-chamber case 5.

Figure 5:
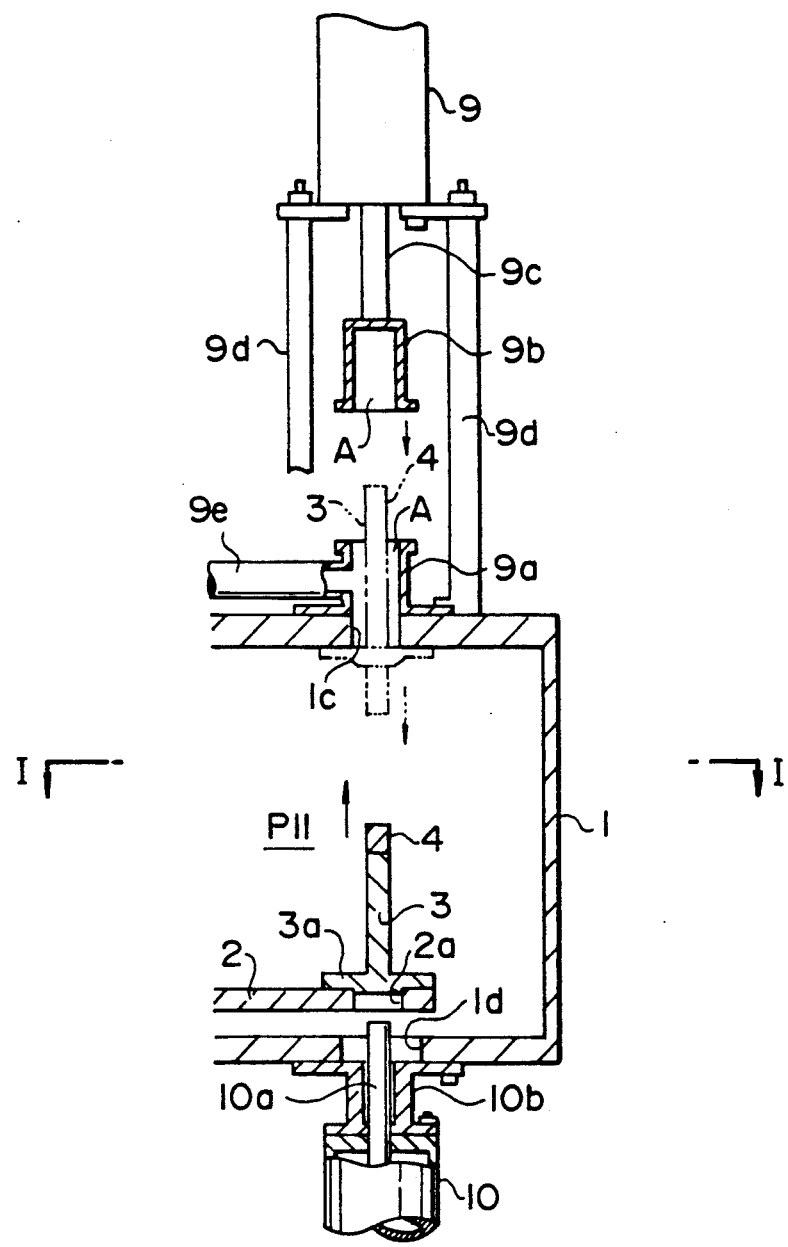
FIG. 5 is a fragmentary cross-sectional view taken along the line V—V in FIG. 1.

FIG. 5 is a cross-sectional view of the takeout/insertion chamber P11. As shown in FIG. 5, the takeout/insertion chamber P11 is formed by a part of the closed container 1 per se. The takeout/insertion chamber P11 has an upper portion, that is, the closed container 1 has an upper face which is provided with a takeout/insertion operating section whose major part is composed of a seal mount 9a and a bell jar 9b, in order to perform takeout and insertion of the mold 4 without destroying or disturbing the gas tightness of the closed container 1. That is, the seal mount 9a is a tubular element which is fixedly mounted to the closed container 1 so as to communicate with a bore 1c which is formed in the upper face of the closed container 1. Further, the bell jar 9b is held by a piston rod 9c of a piston/cylinder assembly 9 for vertical movement. Normally, the seal mount 9a and the bell jar 9d cooperate with each other to form a takeout/insertion operating chamber A under the condition that the seal mount 9a and the bell jar 9b are joined to each other. In this connection, the piston/cylinder assembly 9 is fixedly mounted to the closed container 1 by means of a plurality of attaching rods 9d. Connected to the seal mount 9a is a pipe 9e which is connected to a vacuum pump, a non-oxidizing-gas supply tank, or the like which is not shown.

On the other hand, provided at the lower portion of the takeout/insertion chamber P11, that is, at the lower face of the closed container 1 is an elevating or lifting rod 10a and a piston/cylinder assembly 10. The lifting rod 10a lifts up the mold holding mount 3 to move the same to a location within the above-described takeout/insertion operating chamber A without disturbing the gas tightness of the closed container 1. The piston/cylinder assembly 10 is provided for driving the lifting rod 10a to lift up and lower the same. The lifting rod 10a is inserted into the closed container 1 through a bore 1d which is formed in the bottom of the closed container 1, and is moved vertically. Further, the piston/cylinder assembly 10 is fixedly mounted to the closed container 1 through a mounting fastener 10b without disturbing the gas tightness of the closed container 1.

At takeout and insertion, the mold holding mount 3 is lifted up by the lifting rod 10a, and is moved into the takeout/insertion operating chamber A. At this time, the bore 1c is blocked or closed by the lower portion 3a of the mold holding mount 3. Under this condition, the bell jar 9b is lifted up, and the takeout/insertion operation is done. When the takeout/insertion operation is completed, the bell jar 9b is moved downwardly, and the takeout/insertion operating chamber A is brought to atmosphere identical with the interior of the closed container 1, such as vacuum, non-oxidizing atmosphere, or the like. Subsequently, the lifting rod 10a is moved downwardly, and the mold holding mount 3 rests on the rotary table 2.

In connection with the above, the takeout/insertion chamber P12 is identical in construction with the above-described takeout/insertion chamber P11 and, therefore, the description of the takeout/insertion chamber P12 will be omitted.

Furthermore, each of the rapid cooling chambers P25 and P26 is provided with a rapid cooling mechanism or the like due to gas which is not shown. However, the mechanism comprises nozzles known well and is general in construction and, therefore, the description of the rapid cooling mechanism will be omitted.

An example, in which the above-described manufacturing apparatus was used to mold two kinds of glass materials to be molded which are different in molding conditions from each other, will be described below, following steps of procedure.

The two kinds of glass materials used are as follows:

[I] Glass material G1 to be molded
  (1) Composition (weight %)
    $SiO_2$: 39.2
    $B_2O_3$: 14.5
    $Al_2O_3$: 5.0
    BaO: 41.3
  (2) Transition Temperature: 615° C.

[II] Glass material G2 to be molded
  (1) Composition (weight %)
    $SiO_2$: 27.8
    $Na_2O$: 1.8
    $Al_2O_3$: 2.0
    PbO: 65.2
    $K_2O$: 1.2
    $TiO_2$: 2.0
  (2) Transition Temperature: 435° C.

Processing conditions at the processing chambers are as follows:
Atmosphere within the closed container 1: Non-oxidizing atmosphere
Temperature within First Heating Chamber P13: 840° C.
Temperature within First Heating Chamber P14: 640° C.
Temperature within Second Heating Chamber P15: 840° C.
Temperature within Second Heating Chamber P16: 640° C.
Temperature within Soaking Chamber P17: 700° C.
Temperature within Soaking Chamber P18: 520° C.
Temperature within Press Chamber P19: 700° C.
Temperature within Press Chamber P20: 520° C.
Press Pressure at Press Chambers P20 and P21: 60 $Kg/cm^2$
Pressurizing Time within the Press Chambers P20 and P21: 45 seconds
Temperature within First Gradual-Cooling Chamber P21: 600° C.
Temperature within First Gradual-Cooling Chamber P22: 430° C.
Temperature within Second Gradual-Cooling Chamber P23: 350° C.
Temperature within Second Gradual-Cooling Chamber P24: 300° C.
The glass materials are rapidly cooled to a value equal to or less than 250° C.
Rotational Angle or Rotary Table 2: 45°/one step
Rotational Speed of Rotary Table 2: 5 sec/one step
Stop Time of Rotary Table 2: 55 sec/one step First, the glass materials G1 and G2 to be molded are changed into the molds 4. The molds 4 and 4 are set respectively on the mold holding mounts 3 which are located respectively within the takeout/insertion chambers P11 and P12. This operation is done during stop of the rotary table 2.

The rotary table 2 is moved angularly by 45° for single movement, and the molds 4 containing glass materials 6 are moved to the subsequent processing compartment. That is, each of the molds 4 merely passes through the adjacent processing chamber, and stops at a subsequent predetermined processing chamber. Accordingly, in the case where the two kinds of glass materials to be molded are successively molded like the present embodiment, the processing chambers for molding respective glass materials are alternately arranged on every one.

The mold 4 containing glass material G1 is successively transferred through the first heating chamber P13, the second heating chamber P15, the soaking chamber P17, the press chamber P19, the first gradual-cooling chamber P21, the second gradual-cooling chamber P23 and the rapid cooling chamber P25. The mold 4 containing glass material G1 is processed for a predetermined period of time at the respective processing chambers. During transferring of the mold 4 containing glass material G1, the mold 4 containing glass material G2 merely passes through the first heating chamber P14, the second heating chamber P16, the soaking chamber P18, the press chamber P20, the first gradual-cooling chamber P22, the second gradual-cooling chamber P24 and the rapid cooling chamber P26, which are provided for processing the glass material G1.

Likewise, the mold 4 containing glass material G2 is set on the mold holding mount 3 which is located at the takeout/insertion chamber P12. The glass material G2 is successively transferred through the first heating chamber P14, the second heating chamber P16, the soaking chamber P18, the press chamber P20, the first gradual-cooling chamber P22, the second gradual-cooling chamber P24 and the rapid cooling chamber P26. The glass material G2 is processed for a predetermined period of time at the respective processing chambers. During transferring of the mold 4 containing glass material G2, the mold 4 containing glass material G1 merely passes through the first heating chamber P13, the second heating chamber P15, the soaking chamber P17, the press chamber P19, the first gradual-cooling chamber P21, the second gradual-cooling chamber P23 and the rapid cooling chamber P25, which are provided for processing the glass material G1.

In connection with the above, when the mold holding mounts 3 are moved angularly about the axis X, the shutters S11, S12, S13, S14, S15, S16, S17, S18, S19, S20, S21, S22 and S23 are moved to their respective open positions all together, so that the mold holding mounts 3 can be moved angularly about the axis X.

Here, the glass materials G1 and G2, which have completed the soaking processing within the soaking chambers P17 and P18, have their viscosity brought to $10^{8.5}$ poises suitable for molding. The glass materials G1 and G2 are pressurized under the condition that the viscosity is maintained. A period of time of the pressurizing is forty-five (45) seconds. Subsequently, the glass materials G1 and G2 are transferred to the gradual-cooling compartment where the glass materials G1 and G2 are gradually cooled. Within the second gradual-cooling chambers P23 and P24, the glass materials G1 and G2 are cooled until their viscosity is brought to a value equal to or higher than $10^{13}$ poises. The glass materials G1 and G2 are cooled within the rapid cooling chambers P25 and P26 to a temperature equal to or less than 250° C., to form glass molding articles. Subsequently, the glass molding articles are taken out of the takeout/insertion chambers P11 and P12.

In connection with the above, a period of time within which all of the shutters are moved to their respective open positions during movement of the molds 4, and a period of time within which a first group of molds 4 pass through the processing chambers for a second group of molds 4, i.e., a period of time within which the second group of molds 4 pass through the processing chambers for the first group of molds 4, is extremely short. Thus, deviation from setting temperatures for the respective processing chambers, breaking of the temperature of the glass material 6 within the mold 4, and related problems do not occur.

By the method described above, it is possible to simultaneously mold through a series of processing steps, the two kinds of molding glass materials G1 and G2 which are different in molding condition from each other, and it is possible to simultaneously produce the two kinds of glass molding articles.

In connection with the above, the embodiment has been described above in which two kinds of glass molding articles are simultaneously produced through a series of processing steps. However, the invention should not be limited to this specific embodiment. It is of course that the invention can also be applied to a case where three or more kinds of glass molding articles are produced.

Further, the embodiment has been arranged such that the processing compartments and the processing chambers are arranged along a circle. However, the invention should not be limited to this specific embodiment. The invention can also be applied to an arrangement in which processing compartments and processing chambers are arranged along a straight line. In this case, an insertion chamber is arranged at one end of a straight line in a manufacturing apparatus, and a takeout chamber is arranged at the other end of the straight line.

What is claimed is:

1. A method of simultaneously molding first and second glass preforms, having different thermal characteristics comprising the steps of:

(i) providing a plurality of molds with glass preforms;
(ii) positioning multiple processing compartments along a predetermined path with discrete first and second treatment chambers in each compartment for processing the respective first and second glass preforms, respectively, having different thermal characteristics, each compartment being formed to provide a single treatment step using temperature as a common process parameter for each treatment chamber associated therewith;
(iii) disposing at least a pair of said molds with said first and second preforms into said first and second treatment chambers, respectively, of a first compartment;
(iv) moving said pair of molds with preforms to treatment chambers, respectively, of a processing compartment subsequent to said first compartment along said predetermined path of said compartments with only said first glass preform being processed in said first treatment chamber of each compartment and only said second glass preform being processed in said second treatment chamber of each compartment;
(v) treating said pair of molds with the respective first and second preforms in the respective first and second chambers in each processing compartment so that each said glass preform in each first chamber is treated in an associated compartment by a different temperature than the temperature used for treatment of the other of said glass preforms in the second chamber of said associated compartment; and
(vi) upon completion of treatment in said first compartment, simultaneously transferring the pair of molds with said first and second glass preforms to the first and second treatment chambers in said subsequent processing compartment, wherein said first compartment is a heating compartment for heating said first and second preforms to different temperatures in said first and second chambers thereof, and one of said multiple processing compartments subsequent to said first compartment is a press molding compartment having first and second press molds in the first and second treatment chambers thereof for molding said first and second preforms, respectively, at different temperatures.

2. A method of simultaneously press molding said first and second glass preforms according to claim 1 wherein said processing compartment has no more than two chambers.

3. A method of simultaneously press molding said first and second glass preforms according to claim 1 wherein said processing compartments are generally arranged about a circle.

4. A method of simultaneously press molding said first and second glass preforms according to claim 1 whrein said molds are moved incrementally through said compartments.

* * * * *